United States Patent
Hutchins

(10) Patent No.: US 7,082,903 B2
(45) Date of Patent: Aug. 1, 2006

(54) TEMPERATURE RESPONSIVE FLOW CONTROL VALVES FOR ENGINE COOLING SYSTEMS

(75) Inventor: William R. Hutchins, Kenilworth (GB)

(73) Assignee: Ford Global Technologies, LLC, Dearborn, MI (US)

(*) Notice: Subject to any disclaimer, the term of this patent is extended or adjusted under 35 U.S.C. 154(b) by 5 days.

(21) Appl. No.: 10/836,060

(22) Filed: Apr. 30, 2004

(65) Prior Publication Data

US 2004/0216701 A1 Nov. 4, 2004

(30) Foreign Application Priority Data

May 2, 2003 (GB) .................. 0310122.7

(51) Int. Cl.
*F01P 7/16* (2006.01)
(52) U.S. Cl. .................. 123/41.1; 123/41.05
(58) Field of Classification Search ............. 123/41.1, 123/41.05, 41.09, 41.51
See application file for complete search history.

(56) References Cited

U.S. PATENT DOCUMENTS

| | | | | |
|---|---|---|---|---|
| 4,875,437 A | * | 10/1989 | Cook et al. ............... | 123/41.1 |
| 5,727,729 A | * | 3/1998 | Hutchins ................... | 236/34.5 |
| 5,979,778 A | * | 11/1999 | Saur ........................ | 236/34.5 |
| 6,065,682 A | | 5/2000 | Frunzetti | |
| 6,196,168 B1 | | 3/2001 | Eckerskorn et al. | |
| 6,539,899 B1 | * | 4/2003 | Piccirilli et al. ............ | 123/41.1 |
| 2004/0108387 A1 | * | 6/2004 | Colas et al. ............... | 236/34.5 |

FOREIGN PATENT DOCUMENTS

| | | |
|---|---|---|
| EP | 0587981 | 8/1996 |
| EP | 1024256 | 8/2000 |
| EP | 0794327 | 10/2003 |
| GB | 2387647 | 10/2003 |
| GB | 2394277 | 4/2004 |
| GB | 2394537 | 4/2004 |

* cited by examiner

Primary Examiner—Mahmoud Gimie
Assistant Examiner—Jason Benton
(74) Attorney, Agent, or Firm—Diana D. Brehob; Allan J. Lippa

(57) ABSTRACT

An engine cooling system has a primary cooling circuit with a pump to circulate liquid coolant through an engine, the coolant being returned to the pump via a radiator and a bypass arranged in parallel. A temperature-responsive control valve controls flow as between said radiator and the bypass. The valve housing defines: a hot inlet connected to the bypass, a cold inlet connected to the radiator, and a valve chamber. The valve further includes a first valve member in the valve chamber movable between two limits to control the flow of coolant from the hot inlet to the outlet, a second valve member in the valve chamber movable between two limits to control coolant flow from the cold inlet to the outlet; and a temperature-responsive actuator to move the first and second valve members.

34 Claims, 7 Drawing Sheets

TEMPERATURE RESPONSIVE FLOW CONTROL VALVES FOR ENGINE COOLING SYSTEMS

FIELD OF THE INVENTION

This invention relates to a thermostatically controlled valve and in particular to temperature responsive control valves for use in engine cooling systems, particularly but not exclusively, for motor vehicles.

BACKGROUND OF THE INVENTION

Typically, an engine cooling system has a pump to circulate coolant used to cool the engine, a radiator to cool the coolant and a bypass to allow coolant to circulate through the engine without being cooled by the radiator. In motor vehicles, a cabin heater is usually, provided so that the coolant warmed by the engine provides heating for any occupants of the vehicle. Additionally, the main engine coolant is often used to cool one or more additional heat exchangers or radiators such as a transmission oil cooler, a fuel cooler or an air-charge cooler. A temperature responsive control valve is provided to control the flow of coolant through the radiator and frequently also to control the flow of coolant through the bypass.

It is an object of this invention to provide a temperature-responsive control valve for use in an engine cooling system that can provide improved control of flows under a variety of engine running conditions.

SUMMARY OF THE INVENTION

According to a first aspect of the invention there is provided a temperature-responsive control valve for use in an engine cooling system having a primary cooling circuit in which a pump circulates liquid coolant to an engine, coolant from the engine is returned to the pump through a radiator and a bypass arranged in parallel and the control valve controls flow as between the radiator and the bypass. The control valve has a housing defining a first or hot inlet which in use is connected to the bypass, a second or cold inlet which in use is connected to the radiator, an outlet which in use is connected to the pump, a valve chamber, a first valve member in the valve chamber and movable between two limits to control the flow of coolant from the hot inlet to the outlet, a second valve member movable between two limits to control coolant flow from the cold inlet to the outlet and a temperature responsive actuator to move the first and second valve members. The control valve is operable to substantially prevent coolant flow from the hot and cold inlets to the outlet when the temperature of the coolant sensed by the temperature responsive actuator is below a first predetermined temperature, to permit coolant flow only from the hot inlet to the outlet when the sensed temperature is between the first predetermined temperature and a second higher predetermined temperature, to permit coolant flow from both of the inlets to the outlet when the sensed temperature is between the second temperature and a third higher temperature, and to permit coolant flow only from the cold inlet to the outlet when the sensed temperature exceeds the third predetermined temperature.

Preferably, the first valve member is arranged so that at one limit of movement, which corresponds to a sensed temperature at or below the first predetermined temperature, it is operable to substantially prevent coolant flow from the hot inlet to the outlet. At or near the other limit of movement, which corresponds to a sensed temperature at or above the third predetermined temperature, it is operable to substantially prevent coolant flow from the hot inlet to the outlet. Between these limits, when the sensed temperature is above the first predetermined temperature but below the third predetermined temperature, it is operable to permit coolant flow from the hot inlet to the outlet.

The second valve member may be operable to substantially prevent coolant flow from the cold inlet to the outlet when the sensed temperature is below the second predetermined temperature and to permit coolant flow from the cold inlet to the outlet when the sensed temperature is at or above the second predetermined temperature.

In a preferred arrangement, the first and second valve members are axially movable in the housing such that in one direction the valve members can move towards the hot inlet and away from the cold inlet and in the other direction the valve members can move towards the cold inlet and away from the hot inlet, in which case the first valve member conveniently comprises a tubular valve spool having a bore defining a coolant flow passage for coolant from the hot inlet and the second valve member comprises a flange which is positioned between the valve spool and the cold inlet. Preferably, the temperature responsive actuator is spring biased towards the cold inlet and is operable to move the first and second valve members further away from the cold inlet as the sensed temperature is increased. The valve spool may have a sealing surface to form a seal with a complementary sealing surface in the housing to substantially prevent coolant flow from the bore of the valve spool to the outlet when the sealing surfaces are in contact. The valve spool may further comprise an annular flange, which may have a cylindrical skirt. Preferably, the sealing surface on the valve spool is a chamfered surface formed on the annular flange and the complementary sealing surface is a chamfered surface formed in the housing between the cold inlet and the valve chamber. When the two sealing surfaces are in contact, it is preferable that a restricted flow from the hot inlet to the outlet through the bore of the valve spool is allowed in use.

Spacers may be interposed between the annular flange and the second valve member to allow coolant flow from the bore of the valve spool and past the sealing surfaces to the outlet.

In one embodiment, the first valve member is spring biased towards the cold inlet, in which case a biasing spring is interposed between the valve spool and the housing. An annular washer may be located in the valve chamber at the juncture of the hot inlet and the valve chamber, the biasing spring abutting the annular washer so that in use the annular washer moves away from the hot inlet against the biasing spring to permit the flow of coolant from the hot inlet to the outlet if the pressure in the hot inlet exceeds the pressure in the outlet by a magnitude dependent on the load of the biasing spring. The valve spool may have a cylindrical outer surface and the annular washer a central aperture such that it is a sliding fit over the cylindrical outer surface of the valve spool.

A plug may be provided in the hot inlet for engagement with the bore of the valve spool when the valve spool is at or near its limit of travel towards the hot inlet, the arrangement being such that, when the plug is significantly engaged with the bore in the first valve member, substantially no coolant can flow from the hot inlet into the bore of the valve spool.

Conveniently, the temperature responsive actuator has an actuator body slidable in the bore of the valve spool, in which case the valve may further comprise an abutment in the cold inlet, the temperature responsive actuator having a pushrod interposed between the abutment and the actuator body to move the actuator body away from the cold inlet.

The temperature sensed by the temperature responsive actuator may be a combination of the temperature of the coolant in the hot and cold inlets, the temperature responsive actuator being preferably arranged such that the temperature of the coolant in the hot inlet is dominant in the control of coolant through the hot and cold inlets. In such an arrangement, the sensed temperature may be equal to $((X*T_1)+(Y*T_2))$ where X is selected between 0.6 and 0.95, Y is selected between 0.4 and 0.05, $T_1$ is the temperature of the coolant in the hot inlet and $T_2$ is the temperature of the coolant in the cold inlet.

Where the engine cooling system further comprises a secondary cooling circuit in which a secondary heat exchanger is supplied with coolant for return to the pump, the valve may further comprise a secondary outlet connected to the valve chamber to provide coolant to the secondary heat exchanger. The first valve member may be adapted to selectively open and close the secondary outlet depending upon the temperature sensed by the temperature responsive actuator, e.g. by the cylindrical skirt cooperating with the secondary outlet. Preferably, the secondary outlet is closed when the sensed temperature is below the first predetermined temperature, is open when the sensed temperature is above the second predetermined temperature and is partially open when the sensed temperature is above the first predetermined temperature but below the second predetermined temperature. The secondary heat exchanger may be a transmission oil cooler.

Where the engine cooling system further comprises an auxiliary circuit, coolant being taken from the engine through an auxiliary device and returned to the pump, the valve may further comprise an auxiliaries inlet to return coolant from the auxiliary device to the outlet. The first valve member may be adapted to selectively open and close the auxiliary inlet depending upon the temperature sensed by the temperature responsive actuator, the cylindrical skirt being preferably positioned to selectively block the auxiliary inlet. Preferably, the auxiliary inlet is closed when the sensed temperature is above the third predetermined temperature, is open when the sensed temperature is below the second predetermined temperature and is partially open when the sensed temperature is above the second predetermined temperature but below the third predetermined temperature. The valve spool may have a window which allows coolant in the valve chamber to contact the actuator body over a substantial area while the actuator body blocks the window for flow from the bore of the valve spool into the valve chamber. The heat exchanger is typically a cabin heater for a motor vehicle.

According to a second aspect of the invention there is provided an engine cooling system comprising a primary cooling circuit in which a pump circulates liquid coolant to an engine, coolant from the engine is returned to the pump through a radiator and a bypass arranged in parallel and a temperature responsive control valve controls flow as between the radiator and the bypass, wherein the control valve is a temperature responsive control valve according to said first aspect of the invention, the hot inlet being connected to the bypass, the cold inlet being connected to the radiator and the outlet being connected to the pump.

The cooling system may further comprise a secondary cooling circuit in which a secondary heat exchanger is supplied with coolant for return to the pump, the valve further comprising a secondary outlet connected to the valve chamber to provide coolant to the secondary heat exchanger. The secondary heat exchanger may be a transmission oil cooler.

The cooling system may further comprise an auxiliary circuit, coolant being taken from the engine through an auxiliary device and returned to the pump, the valve further comprising an auxiliary inlet to return coolant from the auxiliary device to the outlet. The heat exchanger is typically a cabin heater for a motor vehicle.

BRIEF DESCRIPTION OF THE DRAWINGS

The invention will now be described by way of example with reference to the accompanying drawings, of which.

DETAILED DESCRIPTION

Figure 1:
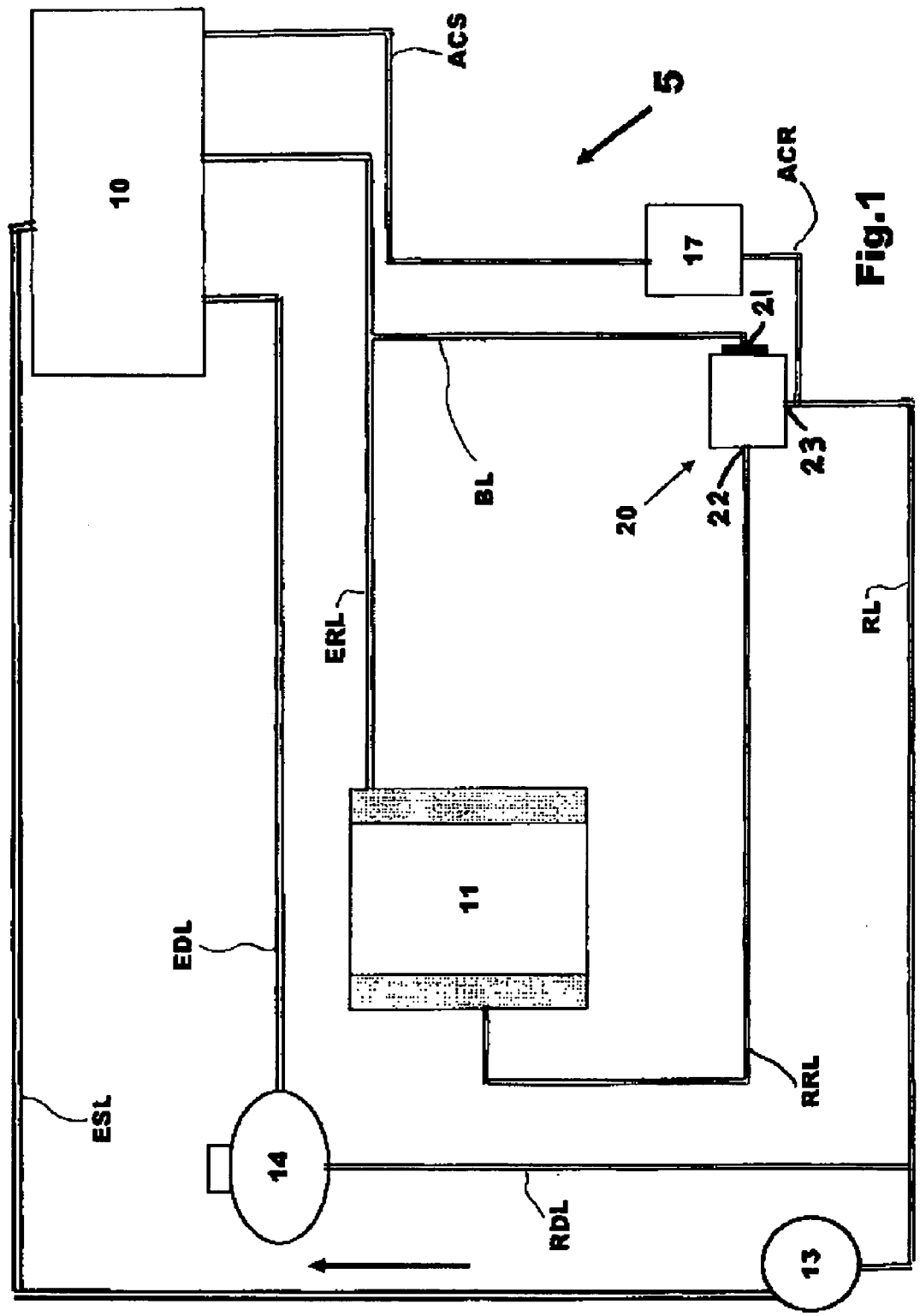
FIG. 1 is a diagram of a first example of an engine cooling system incorporating a first embodiment a temperature responsive control valve according to the invention.
Figure 4:
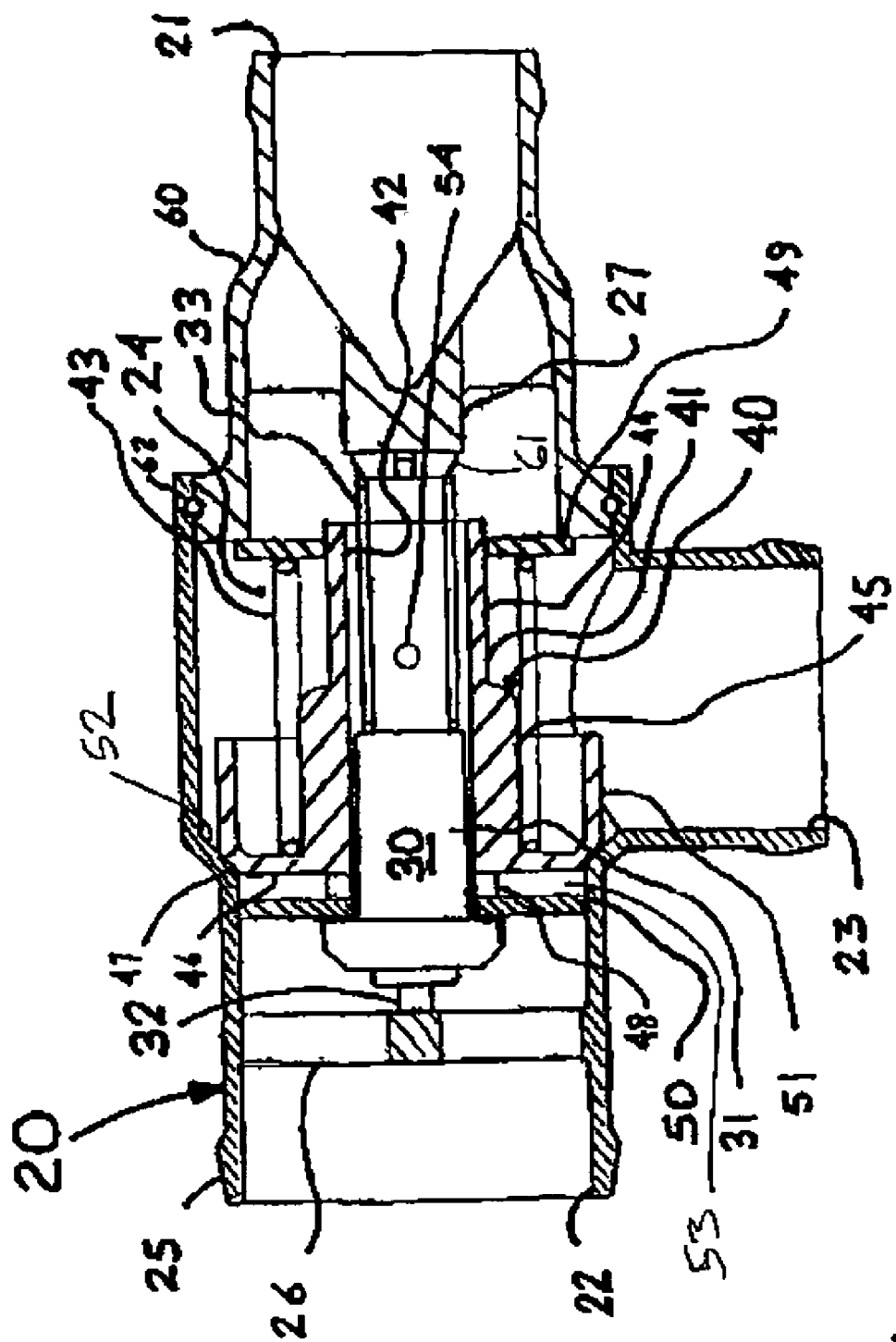
FIG. 4 is cross-section through the temperature sensitive control valve shown in FIG. 1.
Figure 5:
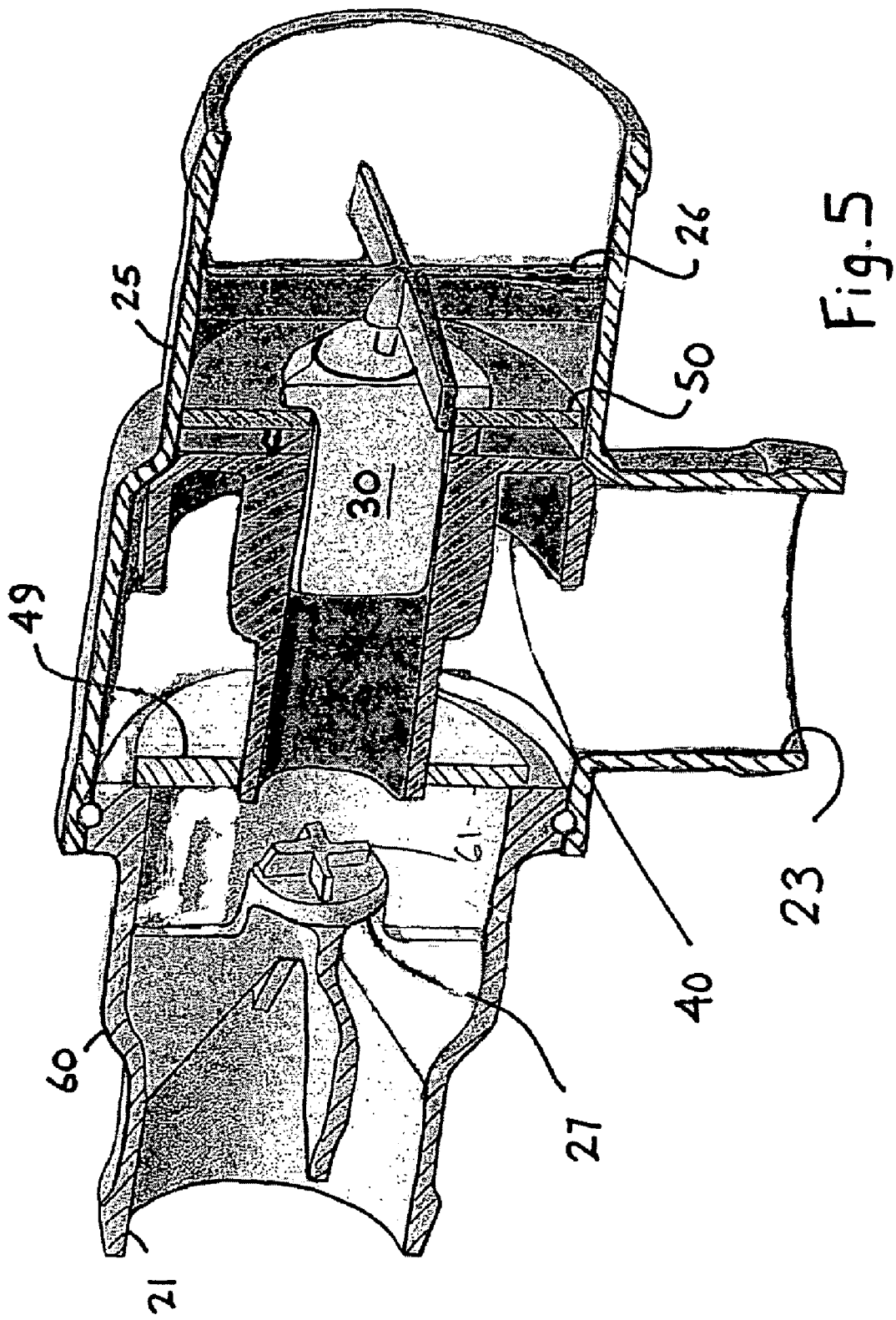
FIG. 5 is a perspective cut-away view of the control valve shown in FIG. 4.

With particular reference to FIGS. 1, 4 and 5, an engine cooling system 5 comprises a primary cooling circuit having pump 13 for circulating liquid coolant to an engine 10 through an engine supply line ESL. Coolant from the engine 10 is returned to the pump 13 through an engine return line ERL, through a radiator 11 and a bypass BL arranged in parallel and a pump return line RL. A temperature responsive control valve 20 controls flow as between the radiator 11 and the bypass BL and has a first or hot inlet 21 connected to the bypass BL, a second or cold inlet 22 connected by a radiator return line RRL to the outlet from the radiator 11 and an outlet 23 connected to the pump return line RL. A temperature-responsive control valve fitted in this location in an engine cooling system is usually simply known as a thermostat and where appropriate this term will be used for convenience.

An auxiliary or heater circuit has a liquid to air heat exchanger in the form of a cabin heater 17, coolant being taken directly from the engine 10 through an auxiliary circuit supply line ACS and returned to the primary circuit by an auxiliary circuit return line ACR connected to the return line RL. The primary cooling circuit also includes a degas or expansion tank 14 connected to the engine through an engine degas line EDL and to the pump return line RL through a return degas line RDL.

The thermostat 20 includes a T-shaped housing 25 of plastic material defining the cold inlet 22, the outlet 23 and a valve chamber 24 which is closed at one end opposite the cold inlet 22 by a retainer member 60 which defines the hot inlet 21. The retainer member 60 is connected to the plastic housing 25 by a convenient fastening means such as a circlip 62 and sealed by an 'O' ring seal (not shown).

A temperature-responsive actuator 30 is located in the valve chamber 24 together with a first valve member 40, the actuator 30 having an actuator body 31 containing a temperature responsive means such as wax and a pushrod 32 extending from one end of the body 31. Such temperature responsive actuators are common in engine cooling systems. Normally they are simply known as thermostat capsules, so this term will be used here for convenience. The pushrod 32 cooperates with a spoked abutment 26 located in the cold inlet 22 to urge the capsule body 31 away from the cold inlet 22 when the temperature sensed by the capsule 30 increases, biasing means in the form of a helical spring 33 being provided to bias the capsule body 31 towards the cold inlet 22. The spring 33, conveniently referred to as the inner spring, provides a force of approximately 25N (Newtons) to the valve body 31 when the capsule 30 is in the normal fitted condition as shown in FIG. 4 when the engine and cooling system are cold.

A second valve member 50 in the form of an annular brass washer is attached to the capsule body 31 (e.g. by soldering) near the end of the body 31 from which extends the pushrod 32 to form a flange which, in the condition shown in FIGS. 4 and 5, extends a small distance into the cold inlet 22 and is thus positioned between the cold inlet 22 and the first valve member 40. It will be appreciated that it would also be possible to form the second valve member 50 as a flange forming an integral part of the capsule body 31. The first valve member 40 comprises a tubular valve spool 41 having a through bore 42 defining a coolant passage, the valve spool 41 being biased towards the cold inlet 22 by another helical spring 43, conveniently referred to as the outer spring. The capsule body 31 is positioned within the bore 42 of the valve spool 41 with a substantial radial clearance to allow coolant flow over the capsule body. The capsule body 31 may also be fluted which helps to allow such coolant flow. Also, the bore 42 may have longitudinal ribs to keep the capsule body 31 concentric with the bore 42, coolant being able to flow over the body through gaps between adjacent ribs.

The valve spool 41 has a stepped outer cylindrical surface forming first and second cylindrical portions 44 and 45. At the end of the valve spool 41 closest to the cold inlet 22 there is an annular flange 46 against which one end of the outer spring 43 reacts. The opposite end of the outer spring 43 reacts against an annular washer 49 which is a sliding fit on the first cylindrical portion 44 of the valve spool 41 and lies against an end face of the retainer member 60. The washer 49 is thus located in the housing 25 at the juncture of the valve chamber 24 and the hot inlet 21. In this example the outer spring 43 provides a force of approximately 20N to the valve spool 41 when in the normal fitted condition as shown in FIG. 4.

At the outer circumference of the flange 46 there is a cylindrical skirt 51 and a frusto-conical or chamfered surface 47 which provides a seal when in contact with a corresponding complementary chamfered surface or seat in the housing 25. When the chamfered surfaces 47, 52 are in contact, substantially no coolant can flow from the bore 42 of the valve spool 41 and past the flange 46 to the outlet 23. Spacers in the form of projections or castellations 48 are positioned between the flange 46 and the second valve member 50 to define radial passages between the bore 42 of the valve spool 41 and an annular space or gap 53 between the flange 46 and the second valve member 50. In this example, there are four projections 48 formed as an integral part of the valve spool 41 to define four radial passages. However, similar spacers could be formed as part of the second valve member 50 or as part of a separate component sandwiched between the first and second valve members 40 and 50. When the flange 46 is moved away from the seat 52, coolant can flow from the bore 42 of the valve spool 41 through the radial passages to the outlet 23. An orifice 54 in the first cylindrical portion 44 permits a controlled flow of coolant from the bore 42 to the outlet 23 even when the two chamfered surfaces 47, 52 are in contact. When the engine 10 and the cooling system are cold, the pushrod 32 may be retracted to the extent that a small clearance exists between the second valve member 50 and the projections 48 to ensure that the flange 46 is seated on the housing 25.

The retainer member 60 has a plug 27 formed in the hot inlet 21 for engagement with the bore 42 of the valve spool 41 such that when the plug 27 is significantly engaged with the bore 42 substantially no coolant can flow from the hot inlet 21 into the bore 42. The plug 27 has an end portion comprising four radial ribs 61 for engagement with the inner spring 33, the radially outer ends of the ribs 61 being chamfered to help guide the bore 42 of the valve spool 41 onto the plug 27, at least during initial assembly. As best seen in FIG. 5, the plug 27 is connected to the housing 25 in the hot inlet 21 by means of four spokes.

The valve spool 41 is axially movable between two limits to control the flow of coolant from the hot inlet 21 to the outlet 23 while the second valve member 50 can control flow of coolant from the cold inlet 22 to the outlet 23. The valve spool 41 is arranged so that at one limit of axial movement, i.e. the position at which it is nearest to the cold inlet 22, it can prevent coolant flow from the hot inlet 21 to the outlet 23 (except for a restricted flow through the orifice 54). At or near the other limit of axial movement, i.e. the position at which it is nearest to the hot inlet 21, the valve spool 41 can prevent coolant flow from the hot inlet 21 to the outlet 23. However, for the majority of the axial movement between these limits, the valve spool 41 can allow coolant to flow from the hot inlet 21 to the outlet 23. The second valve member 50 is a sliding fit in the bore in the housing 25 and can prevent the flow of coolant through the cold inlet 22 so long as it is engaged with the bore of the cold inlet 22.

In use, coolant is pumped from the pump 13 along an engine supply line ESL to the engine 10 where it absorbs heat and flows along the engine return line ERL and back to the pump through the radiator 11 or the bypass BL as determined by the thermostat 20. When the engine 10 is started from cold, coolant in the primary cooling circuit is at ambient temperature which, in temperate climates, typically means that the temperature of the coolant is between 0° C. and 25° C. It is desirable to increase the coolant temperature of the coolant in the engine as quickly as possible, not only to reduce engine emissions and improve fuel economy but also to provide effective cabin heating in cold weather. Therefore, during initial running of the engine the thermostat 20 prevents coolant flow through the radiator 11 and restricts flow through the bypass BL.

FIG. 4 shows the position of the first and second valve members 40 and 50 when the temperature sensed by the thermostat capsule 30 is below a first predetermined temperature, in this case 80° C. The valve spool 41 is held against the seat 52 in the housing 25 by the outer spring 43 and the second valve member 50 is fully engaged with the bore of the cold inlet 22. Because the pressures on both sides of the second valve member 50 are substantially equal there is no leakage from the cold inlet 22 to the outlet 23. There is a restricted flow through the orifice 54 which serves to ensure that coolant in the hot inlet 21 is at substantially the same temperature as that of the coolant leaving the engine 10 through the engine return line ERL and the bypass BL.

Typically this flow would be 50 to 100 cc/minute at 0.2 bar pressure and in practice, where the valve spool 41 and the housing 25 are both of a plastic material and in an "as molded" condition, there may be sufficient leakage of coolant between the flange chamfer 47 and the housing seat 52 to make the orifice 54 unnecessary.

As the engine 10 begins to warm up, the temperature in the hot inlet 21 rises and the thermostat capsule 30 reacts more strongly against the springs 33, 43. When the temperature sensed by the thermostat capsule 30 reaches the first predetermined temperature (80° C.) the force supplied by the capsule 30 is sufficient to overcome the preload of the two springs 33, 43 and the valve spool 41 begins to move away from the housing seat 52. Coolant from the hot inlet 21 then starts to flow through the bore 42 and out through the radial passages into the space 53 between the second valve member and the flange 42 from where it flows past the seat 52 into the valve chamber 24 and out through the outlet 23.

When the first predetermined temperature is exceeded but the coolant is below a second, higher, predetermined temperature, in this case 85° C., the thermostat 20 continues to prevent coolant flow through the radiator 11 by stopping any significant flow through the cold inlet 22. However, the rate of flow through the bypass BL is gradually increased by progressive movement of the valve spool 41 away from the seat 52. At the second predetermined temperature the second valve member 50 begins to disengage from the bore of the cold inlet 22 and cold coolant starts to flow past the second valve member 50.

When the temperature sensed by the capsule 30 is above the second predetermined temperature, but below a third predetermined temperature, in this case 90° C., the thermostat 20 allows coolant to flow from the hot inlet 21 and the cold inlet 22 to the outlet 23 and a mixed flow regime exists. The temperature of the coolant leaving the thermostat 20 is then a weighted average based on the flow rates and temperatures of the coolant flowing through the hot and cold inlets 21 and 22, the temperature of the coolant leaving the engine 10 continuing to increase even though an increasing flow of cold coolant from the radiator 11 is allowed to mix with the hot coolant from the hot inlet 21.

When the temperature sensed by the capsule 30 reaches the third predetermined temperature, the plug 27 starts to engage with the bore 42 of the valve spool 41 to prevent coolant entering the bore 42 and stop any significant flow from the hot inlet 21 to the outlet 23 while coolant can now flow freely from the cold inlet 22 to the outlet 23. For sensed temperatures above the third predetermined temperature, the plug 27 becomes further engaged with the bore 42 until the thermostat capsule 30 runs out of movement. At low to moderate engine speeds, i.e. below about 2,500 RPM, there is no significant flow through the bypass BL and the maximum flow is allowed through the cold inlet 22. Hence it is primarily cold coolant from the radiator 11 that flows through to the outlet 23 to provide maximum cooling for the engine 10. However, the plug 27 is a running clearance in the bore 42 of the valve spool 41 and this allows a very small flow of hot coolant through the hot inlet 21 to provide a hot flow over the capsule body 31. This ensures that the control of the thermostat 20 continues to be primarily based on the temperature in the hot inlet 21; although, this flow is so small that it has negligible effect on the cooling performance of the engine 10.

Although the capsule body 31 is primarily located in the bore 42 and in contact with coolant from the hot inlet 21, there is a significant surface area, on the side of the second valve member 50 towards the cold inlet 22, which is in contact with coolant from the cold inlet. Hence the temperature sensed by the capsule 30 is a combination of the temperatures of the coolant in the hot and cold inlets 21 and 22. The positioning of the second valve member 50 on the capsule body 31 helps to determine how the temperatures are combined to form the sensed temperature since this will vary the amount of surface exposed to each of the hot and cold flows. The sensed temperature can be represented by $((X*T_1)+(Y*T_2))$ where X is typically selected between 0.6 and 0.95, Y is selected between 0.4 and 0.05, $T_1$ is the temperature of the coolant in the hot inlet and $T_2$ is the temperature of the coolant in the cold inlet. This ensures that the thermostat 20 is controlled primarily by the temperature of the coolant in the hot inlet 21 so that the initial flow of cold coolant through the cold inlet 22 does not cause the pushrod 32 to retract and set up a cyclic variation of hot flow/cold flow through the radiator and create unwanted thermal stresses. In the example described, the positioning of the second valve member 50 is such that the sensed temperature is equal to $0.9T_1+0.1T_2$.

Although the temperature in the cold inlet 22 has only a small effect it is useful in providing compensation for variations in the ambient temperature, such variations being reflected in corresponding variations in the temperature of coolant flowing from the radiator 11. For example, if the ambient temperature (and hence the starting temperature of the coolant in the radiator) is 20° C., then the temperature sensed by the capsule 30 will be 83° C. when the temperature at the hot inlet is 90° C. Conversely, if the ambient temperature is −20° C., then the sensed temperature with the same hot inlet temperature will be 79° C. In the first situation the sensed temperature is above the first predetermined temperature and the thermostat 20 allows a significant flow of hot coolant through the bypass BL while in the second situation the sensed temperature is below the first predetermined temperature and the bypass is effectively closed to maximize the flow of hot coolant through the heater 17.

At higher engine speeds, e.g. above about 2,500 RPM, the pressure of coolant at the hot inlet 21 exceeds the pressure at the outlet 23 by an amount which is sufficient to lift the washer 49 away from the end face of the retainer member 60 and allow hot coolant to flow from the hot inlet 21 directly to the outlet 23. This helps to avoid excess pressure in the heater 17 and radiator 11 while allowing an adequate flow of coolant through the engine. It also provides a failsafe mechanism should the thermostat capsule 30 fail. The use of two springs 33, 43 in parallel is advantageous in that the outer spring 43 can be optimized to allow the washer 49 to perform its pressure relieving function and the inner spring 33 can make up the difference in force required to act against the thermostat capsule 30. When the sensed temperature increases and the capsule 30 moves the valve spool towards the hot inlet 21, the load of the outer spring 43 increases so that the pressure relieving function of the washer 49 is thermally compensated.

Figure 2:
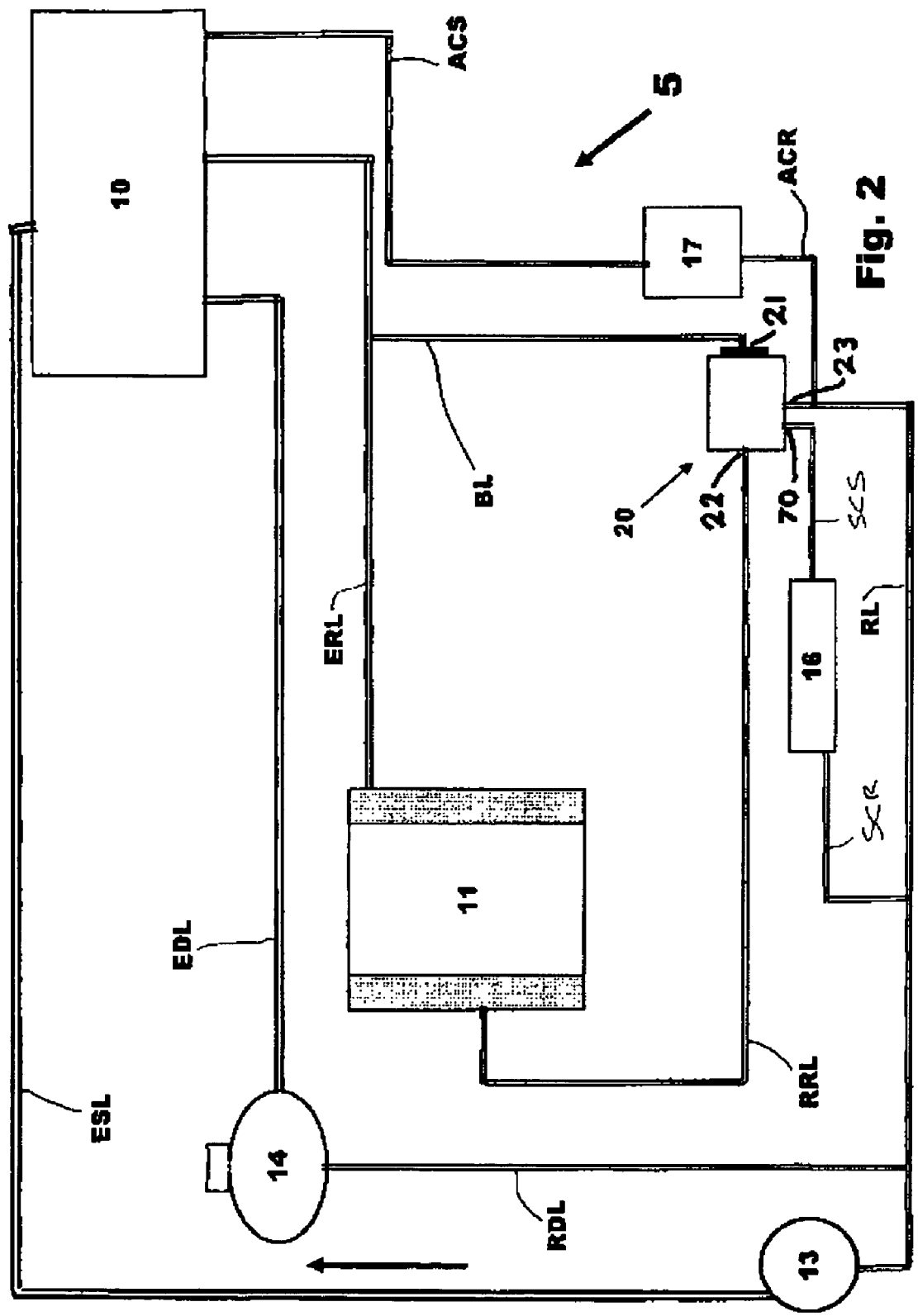
FIG. 2 is a diagram of a second example of an engine cooling system incorporating a second embodiment a temperature responsive control valve according to the invention.
Figure 6:
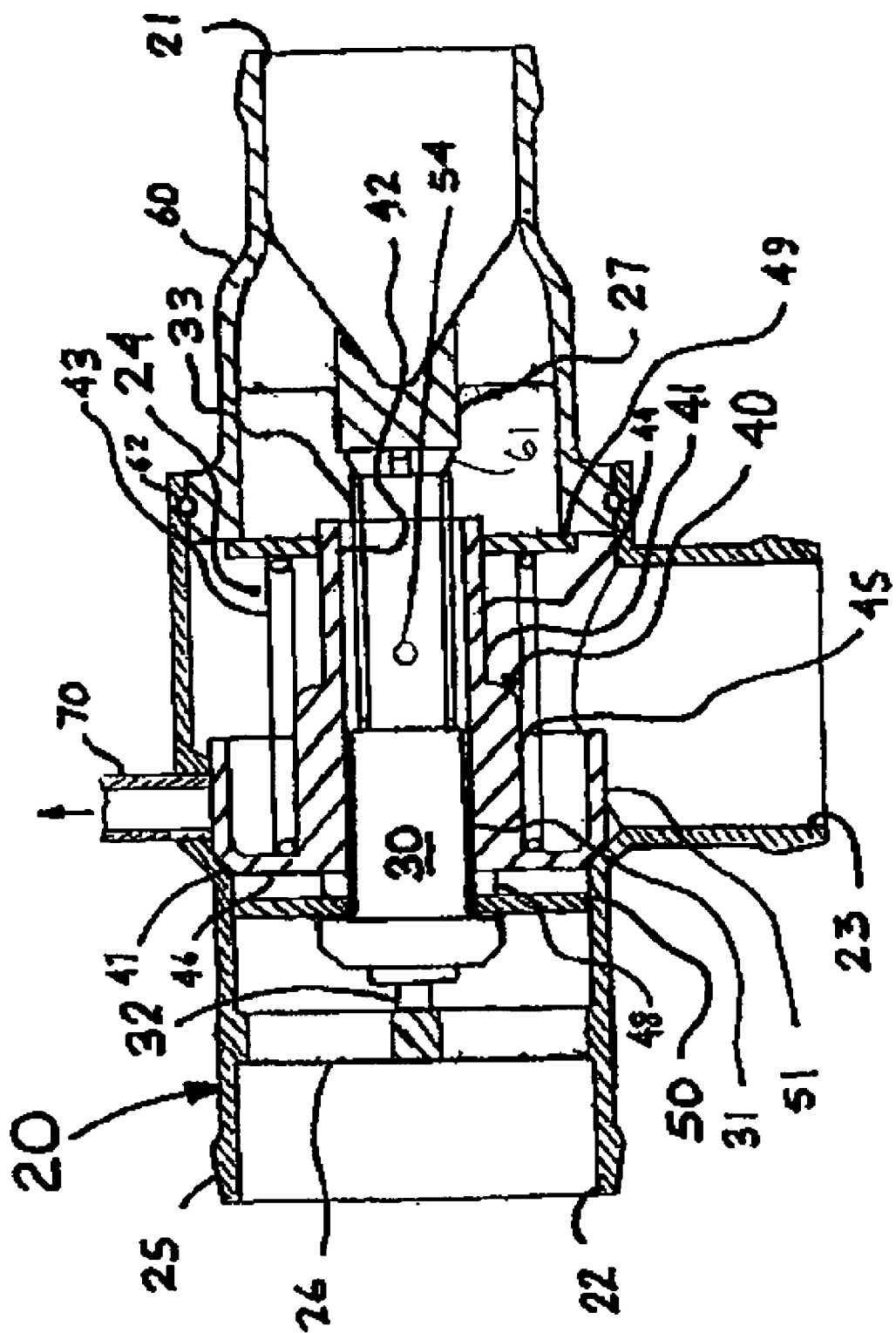
FIG. 6 is cross-section through the temperature sensitive control valve shown in FIG. 2.

FIGS. 2 and 6 show a cooling system and a thermostat which in many respects is identical to those previously described and parts and functions which are common with the first embodiment of the invention will not be described again in detail. The main difference is that the cooling system also includes a secondary cooling circuit in which a secondary heat exchanger in the form of an oil cooler 16 is supplied with coolant through a secondary cooler supply line SCS from a secondary outlet 70 in the thermostat 20. A secondary cooler return line SCR connects the oil cooler 16, in this case a transmission oil cooler, to the return line RL to the pump 13. The secondary outlet 70 is positioned in housing 25 close to the skirt 51 of the valve spool 41 so that the valve spool 41 and the secondary outlet 70 together act as a secondary valve which can selectively close off the secondary cooler supply line SCS.

Operation of the thermostat 20 is identical to that previously described but in addition the flow to the oil cooler 16 is also controlled. When the sensed temperature is below the first predetermined temperature, the valve spool 41 is in the position shown in FIG. 6 where the skirt 51 of the valve spool 41 obstructs the secondary outlet 70 so substantially there is no coolant flow to the oil cooler 16. This is advantageous because when the engine is started from cold, the transmission oil will also be cold so any coolant passing through the oil cooler 16 would slow the heating of the engine 10 and reduce the supply of heat to the heater 17. When the first predetermined temperature is exceeded, the valve spool 41 moves away from the cold inlet 22 and starts to uncover the secondary outlet 70 to allow warm coolant to flow from the hot inlet 21 to the oil cooler 16. This supply of warm coolant is advantageous since it promotes heating of the oil passing the oil cooler 16 thereby allowing the oil to reach a normal running temperature more quickly. This is particularly beneficial since the efficiency of the transmission is lower when the oil is cold because of increased viscosity and drag.

As the sensed temperature continues to increase, the valve spool 41 moves further away from the cold inlet 22 thereby exposing the entire secondary outlet 70 to the supply of warm coolant from the engine 10. Then, as the temperature increases further and the second predetermined temperature is exceeded, cold flow from the cold inlet 22 begins to flow through the secondary outlet 70. The temperature of the coolant passing to the oil cooler 16 now reduces but because this coolant is a mixture of the flows from the hot inlet 21 and the cold inlet 22, as previously described with reference to FIGS. 1, 4 and 5. This is a gradual change and does not impose a sudden thermal shock on the oil cooler 16. Finally, when the third predetermined temperature is reached, only coolant entering through the cold inlet 22 is able to flow to the oil cooler 16 because the plug 27 has engaged with the bore 42 of the valve spool 41. In this condition, the oil cooler 16 receives a supply of the coolest possible coolant to help in maintaining the oil at an acceptable temperature.

Figure 3:
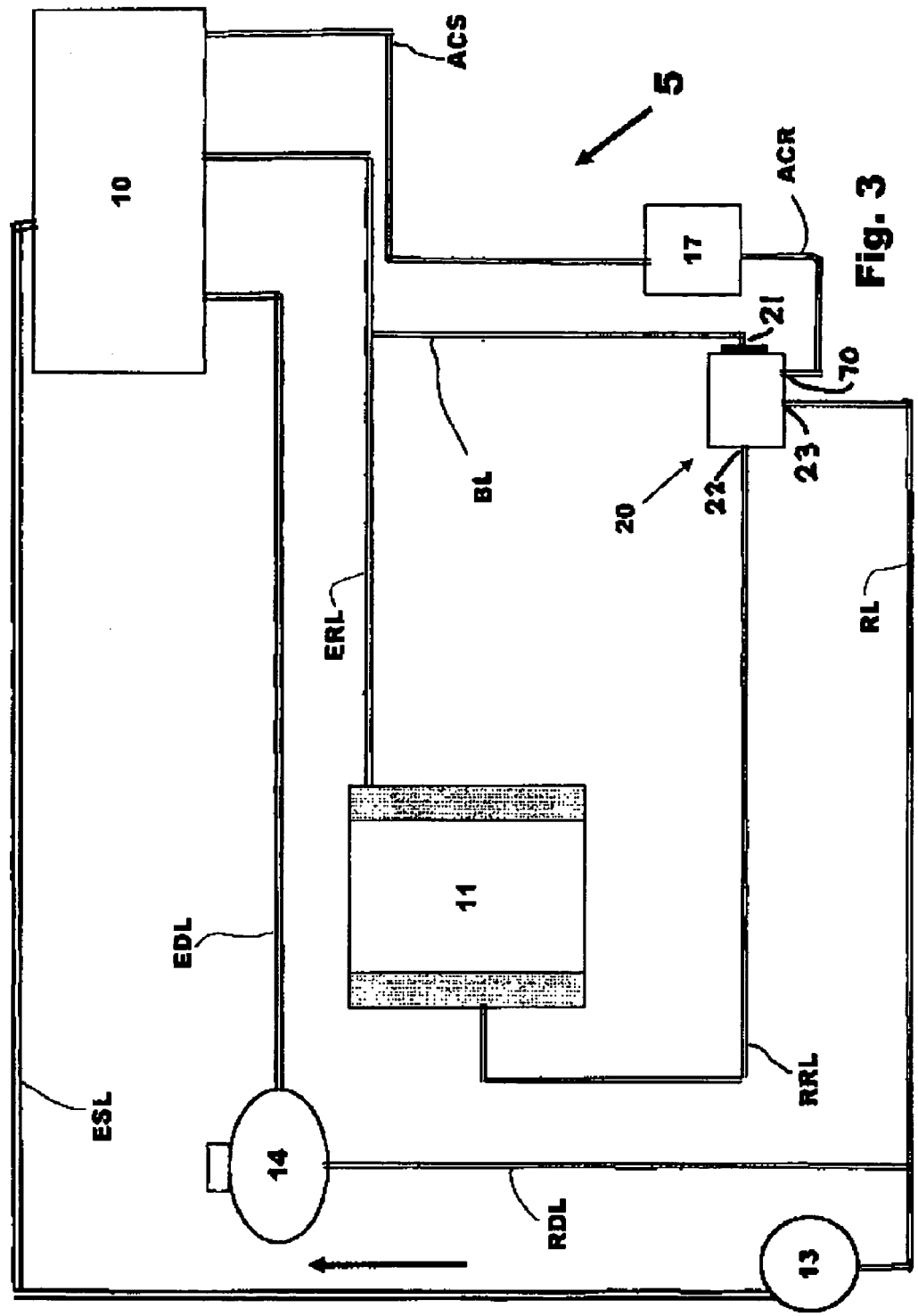
FIG. 3 is a diagram of a third example of an engine cooling system incorporating a third embodiment a temperature responsive control valve according to the invention.
Figure 7:
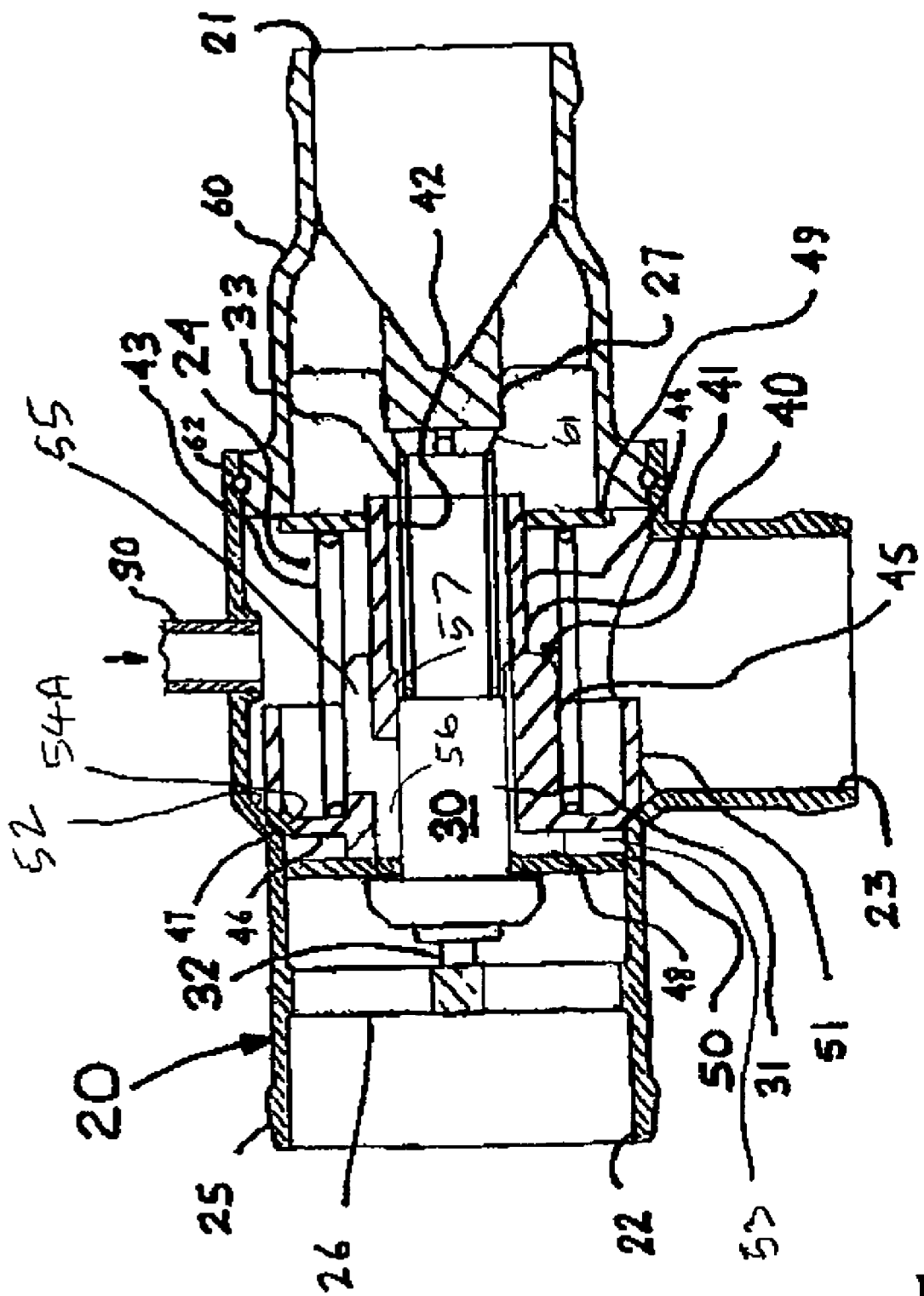
FIG. 7 is cross-section through the temperature sensitive control valve shown in FIG. 3.

FIGS. 3 and 7 also show a cooling system and a thermostat which in many respects are identical to those previously described with reference to FIGS. 1 and 4 and again parts and functions which are common will not be described again in detail. The main difference is that the heater return line ACR is connected to the thermostat 20 at an auxiliary return inlet 90. The auxiliary return inlet 90 is positioned in the housing 25 such that when the valve spool 41 opens it is in close proximity to the skirt 51 of the valve spool 41 to act as a auxiliary valve selectively closing off the heater return line ACR.

The valve spool 41 also differs in that instead of the orifice 54 there is a small groove 54A in the chamfer 47 to serve the same purpose. Furthermore, the capsule body 31 is located by a number (e.g. three) of ribs 57 which extend longitudinally from each of the castellations 48 about half way along the bore 42. Each rib 57 has a longitudinal slot or inner groove 56 which extends from the castellation 48 to a position part way along the bore, stopping well before the end of the capsule body 31. Corresponding longitudinal outer grooves 55 extend along the second cylindrical portion 45 of the valve spool 41 outer cylindrical surface, stopping well before the annular flange 46. Aligned pairs of inner grooves 56 and outer grooves 56 overlap to form a window which allows coolant in the valve chamber 24 to contact the capsule body 31 over a substantial area while the capsule body 31 blocks the inner grooves 56 for flow from the bore 42 of the valve spool 41 into the valve chamber 24. In such an arrangement, the capsule body 31 is preferably of the kind without flutes.

Operation of the thermostat 20 is identical to that previously described but in addition the return from the heater 17 is also controlled. When the temperature flowing through the thermostat 20 is below the first predetermined temperature, the valve spool 41 is positioned as shown in FIG. 7 and there is no restriction to the flow of coolant returning from the heater 17. In this condition the heater 17 is supplied with the maximum available flow of coolant from the engine 10 and at the highest available temperature.

When the sensed temperature reaches the second predetermined temperature, the valve spool 41 has moved away from the cold inlet 22 and the skirt 51 starts to close off the return line ACR from the heater 17 by partially obscuring the auxiliary return inlet 90. When the sensed temperature of the coolant has reached the third predetermined temperature, the skirt 51 fully overlaps the auxiliary return inlet 90 and the flow of coolant through the heater 17 is severely restricted. It will be appreciated that a complete cut off of flow may be undesirable with some types of cabin heating system, e.g. air conditioning systems where there is maximum cooling whenever air conditioning is selected and heating is used to adjust the air temperature.

Because the thermostat 20 is ambient temperature compensated in the ratio 0.9 hot to 0.1 cold, the temperature of the coolant will not reach a sufficiently high temperature to completely shut off the return from the heater until the ambient temperature exceeds a certain level. For example, assume that the ambient temperature is −10° C. and the temperature of the coolant leaving the engine is 95° C. The sensed temperature would be:

$$(0.9*95)+(-10*0.1)=84.5° C.$$

Whereas, if the ambient temperature is 25° C., the sensed temperature would be:

$$(0.9*95)+(25*0.1)=88° C.$$

In this situation, the return is not being restricted but in the second situation there is some restriction. In fact, with an ambient temperature of 25° C., the temperature of the coolant leaving the engine would need to be over 97° C. before the third predetermined temperature is reached and if the ambient temperature is 10° C. then the temperature of the coolant would need to be 99° C. If required, other ratios could be used to provide more ambient temperature compensation but in each case the emphasis is on the hot coolant rather than the cold coolant. That is to say, the ratio is preferably in the range 0.6hot/0.4cold to 0.95hot/0.05cold. In this manner the thermostat 20 ensures that the return from the heater is restricted only when it is unlikely that heat will be required from the heater 17.

The window formed by the overlapping slots 56 and 57 provides a further degree of ambient compensation in that the temperature of the return from the heater 17 is used to adjust the temperature sensed by the thermostat capsule 30. At engine start up from cold, there is little or no effect since the temperature of coolant leaving the heater 17 will be close to ambient. However, as the engine starts to warm up, the heater return temperature will be less than that of the bypass flow in the hot inlet 21 and this will delay the time taken to reach the first and second predetermined sensed temperatures to an extend dependent upon the heater return temperature and flow.

It will be appreciated that the secondary cooling circuit with the oil cooler 16 and the secondary outlet 70, as described in relation to FIGS. 2 and 6, could be incorporated in the cooling system described above in relation to FIGS. 3 and 7. Also, any auxiliary device having similar coolant flow and temperature requirements to the heater 17 could be supplied with coolant in the manner described above.

I claim:

1. A temperature-responsive control valve for use in an engine cooling system, the engine cooling system having a primary cooling circuit having a pump to circulate liquid coolant through an engine, the coolant being returned to the pump via a radiator and a bypass arranged in parallel, the control valve controlling flow as between said radiator and the bypass, said control valve comprising:
    a housing defining:
        a first or hot inlet which in use is connected to the bypass;
        a second or cold inlet which in use is connected to the radiator; and
        a valve chamber;
    a first valve member disposed in said valve chamber movable between first and second limits to control the flow of coolant from said hot inlet to said outlet;
    a second valve member disposed in said valve chamber movable between first and second limits to control coolant flow from said cold inlet to said outlet; and
    a temperature-responsive actuator to move said first and second valve members;
    wherein the control valve is operable:
        to substantially prevent coolant flow from said hot and cold inlets to said outlet when a temperature of the coolant sensed by said temperature-responsive actuator is below a first predetermined temperature;
        to permit coolant flow only from said hot inlet to said outlet when said sensed temperature is between said first predetermined temperature and a second higher predetermined temperature;
        to permit coolant flow from both of said inlets to said outlet when said sensed temperature is between said second predetermined temperature and a third higher predetermined temperature; and
        to permit coolant flow only from said cold inlet to said outlet when said sensed temperature exceeds said third predetermined temperature.

2. The valve claimed in claim 1 wherein said first valve member is arranged so that at first limit of movement, which corresponds to a sensed temperature at or below said first predetermined temperature, said first valve member is operable to substantially prevent coolant flow from said hot inlet to said outlet; at or near said second limit of movement, which corresponds to a sensed temperature at or above said third predetermined temperature, said first valve member is operable to substantially prevent coolant flow from said hot inlet to said outlet; and when said sensed temperature is above said first predetermined temperature but below said third predetermined temperature, said first valve member is operable to permit coolant flow from said hot inlet to said outlet.

3. The valve claimed in claim 1 wherein said second valve member is operable to substantially prevent coolant flow from said cold inlet to said outlet when said sensed temperature is below said second predetermined temperature and to permit coolant flow from said cold inlet to said outlet when said sensed temperature is at or above said second predetermined temperature.

4. The valve claimed in claim 1 wherein said first and second valve members are axially movable in said housing such that in a first direction said valve members move towards said cold inlet and away from said hot inlet and in a second direction said valve members can move towards said hot inlet and away from said cold inlet.

5. The valve claimed in claim 4 wherein said first valve member comprises a tubular valve spool having a bore defining a coolant flow passage for coolant from said hot inlet and said second valve member comprises a flange which is positioned between said valve spool and said cold inlet.

6. The valve claimed in claim 4 wherein said temperature responsive actuator is spring biased towards said cold inlet and is operable to move said first and second valve members further away from said cold inlet as said sensed temperature is increased.

7. The valve claimed in claim 5 wherein said valve spool has a sealing surface to form a seal with a complementary sealing surface in said housing to substantially prevent coolant flow from said bore of said valve spool to said outlet when said sealing surfaces are in contact.

8. The valve claimed in claim 5 wherein said valve spool further comprises an annular flange.

9. The valve claimed in claim 8 wherein said annular flange has a cylindrical skirt.

10. The valve claimed in claim 7 wherein said valve spool further comprises an annular flange, said sealing surface on said valve spool being a chamfered surface formed on said annular flange and said complementary sealing surface being a chamfered surface formed in said housing between said cold inlet and said valve chamber.

11. The valve claimed in claim 7 wherein, t, a restricted flow from said hot inlet to said outlet through said bore of said valve spool is allowed when said two sealing surfaces are in contact.

12. The valve claimed in claim 8 wherein spacers are interposed between said annular flange and said second valve member to allow coolant flow from said bore of said valve spool and past said sealing surfaces to said outlet.

13. The valve claimed in claim 4 wherein said first valve member is spring biased towards said cold inlet.

14. The valve claimed in claim 4 wherein said first valve member comprises a tubular valve spool having a bore defining a coolant flow passage for coolant from said hot inlet and said second valve member comprises a flange which is positioned between the valve spool and the cold inlet, a biasing spring being interposed between said valve spool and said housing so that said first valve member is spring biased towards said cold inlet.

15. The valve claimed in claim 14 wherein an annular washer is located in said valve chamber at a juncture of said hot inlet and said valve chamber, said biasing spring abutting said annular washer so that in use said annular washer can move away from said hot inlet against said biasing spring to permit flow of coolant from said hot inlet to said outlet when pressure in said hot inlet exceeds pressure in said outlet by a magnitude dependent on a load of said biasing spring.

16. The valve claimed in claim 15 wherein said valve spool has a cylindrical outer surface, said annular washer being a sliding fit over cylindrical outer surface of said valve spool.

17. The valve claimed in claim 5 wherein a plug is provided in said hot inlet for engagement with said bore of said valve spool when said valve spool is at or near its limit of travel towards said hot inlet, the arrangement being such that, when said plug is significantly engaged with said bore in said first valve member, substantially no coolant can flow from said hot inlet into said bore of said valve spool.

18. The valve claimed in claim 5 wherein said temperature responsive actuator has an actuator body slidable in said bore of said valve spool.

19. The valve claimed in claim 18 and further comprising an abutment in said cold inlet, said temperature responsive actuator having a pushrod interposed between the abutment and the actuator body to move the actuator body away from the cold inlet.

20. The valve claimed in claim 1 wherein temperature sensed by said temperature responsive actuator is a combination of a coolant temperature of in said hot inlet and a coolant temperature in said cold inlet.

21. The valve claimed in claim 20 wherein said temperature responsive actuator is arranged such that said coolant temperature in said hot inlet is dominant in control of coolant through said hot and cold inlets.

22. The valve claimed in claim 20 wherein said sensed temperature is equal to $((X*T_1)+(Y*T_2))$ where X is selected between 0.6 and 0.95, Y is selected between 0.4 and 0.05, wherein $T_1$ is said coolant temperature in said hot inlet and $T_2$ is said coolant temperature in said cold inlet.

23. The valve claimed in claim 1 wherein the engine cooling system further comprises a secondary cooling circuit wherein a secondary heat exchanger is supplied with coolant for return to said pump, the valve further comprising:
a secondary outlet connected to said valve chamber to provide coolant to said secondary heat exchanger.

24. The valve claimed in claim 23 wherein said first valve member is adapted to selectively open and close said secondary outlet depending upon said sensed temperature.

25. The valve claimed in claim 24 wherein said first and second valve members are axially movable in said housing such that in one direction said valve members move towards said hot inlet and away from said cold inlet and in the other direction said valve members move towards said cold inlet and away from said hot inlet, said first valve member comprising a tubular valve spool having a bore defining a coolant flow passage for coolant from said hot inlet and an annular flange having a cylindrical skirt which cooperates with said secondary outlet, said temperature responsive actuator being spring biased towards said cold inlet and operable to move said first and second valve members away from said cold inlet as said sensed temperature is increased.

26. The valve claimed in claim 24 wherein said secondary outlet is closed when said sensed temperature is below said first predetermined temperature, is open when said sensed temperature is above said second predetermined temperature and is partially open when said sensed temperature is above said first predetermined temperature but below said second predetermined temperature.

27. The valve claimed in claim 1 wherein the engine cooling system further comprises an auxiliary circuit, coolant being taken from the engine through an auxiliary device and returned to the pump, the valve further comprising an auxiliary inlet to return coolant from said auxiliary device to said outlet.

28. The valve claimed in claim 27 wherein the first valve member is adapted to selectively open and close said auxiliary inlet depending upon said sensed temperature.

29. The valve claimed in claim 28 wherein said first and second valve members are axially movable in said housing such that in a first direction said valve members move towards said hot inlet and away from said cold inlet and in a second direction said valve members move towards said cold inlet and away from said hot inlet, said first valve member comprising a tubular valve spool having a bore defining a coolant flow passage for coolant from said hot inlet and an annular flange having a cylindrical skirt which cooperates with said auxiliary inlet, said temperature responsive actuator being spring biased towards said cold inlet and operable to move said first and second valve members further away from said cold inlet as said sensed temperature is increased.

30. The valve claimed in claim 28 wherein said auxiliary inlet is closed when said sensed temperature is above said third predetermined temperature, is open when said sensed temperature is below said second predetermined temperature and is partially open when said sensed temperature is above said second predetermined temperature but below said third predetermined temperature.

31. The valve claimed in claim 29 wherein said valve spool has a window which allows coolant in said valve chamber to contact said actuator body over a substantial area while said actuator body blocks said window for flow from said bore of said valve spool into said valve chamber.

32. An engine cooling system, comprising: a primary cooling circuit wherein a pump circulates liquid coolant to an engine, coolant from the engine is returned to the pump through a radiator and a bypass arranged in parallel and a temperature responsive control valve controls flow as between the radiator and the bypass, wherein the control valve is a temperature responsive control valve having a housing defining a first or hot inlet connected to the bypass, a second or cold inlet connected to the radiator, an outlet connected to the pump, a valve chamber, a first valve member in the valve chamber and movable between two limits to control the flow of coolant from the hot inlet to the outlet, a second valve member movable between two limits to control coolant flow from the cold inlet to the outlet and a temperature responsive actuator to move the first and second valve members, the control valve being operable to substantially prevent coolant flow from the hot and cold inlets to the outlet when the temperature of the coolant sensed by the temperature responsive actuator is below a first predetermined temperature, to permit coolant flow only from the hot inlet to the outlet when the sensed temperature is between the first predetermined temperature and a second higher predetermined temperature, to permit coolant flow from both of the inlets to the outlet when the sensed temperature is between the second temperature and a third higher temperature and to permit coolant flow only from the cold inlet to the outlet when the sensed temperature exceeds the third predetermined temperature.

33. A cooling system as claimed in claim 32 and further comprising a secondary cooling circuit wherein a secondary heat exchanger is supplied with coolant for return to the pump, the valve further comprising a secondary outlet connected to the valve chamber to provide coolant to the secondary heat exchanger.

34. A cooling system as claimed in claim 32 and further comprising an auxiliary circuit, coolant being taken from the engine through an auxiliary device and returned to the pump, the valve further comprising an auxiliary inlet to return coolant from the auxiliary device to the outlet.

* * * * *